US008848676B1

(12) United States Patent
Wheeler et al.

(10) Patent No.: US 8,848,676 B1
(45) Date of Patent: Sep. 30, 2014

(54) APPARATUS AND METHOD FOR COEXISTENT WIRELESS AND BLUETOOTH COMMUNICATION EMPLOYING INTERRUPTION OF ARBITRATION REQUESTS TO ALLOCATE USE OF A SHARED ANTENNA

(75) Inventors: Todd Steven Wheeler, San Jose, CA (US); Myung Cheol Kim, Milpitas, CA (US); Deepak Jain, San Ramon, CA (US); Robert Mack, San Jose, CA (US); Gladys Yuen Yan Wong, Fremont, CA (US); Jigang Chen, San Jose, CA (US); Ronak Anjan Chokshi, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1232 days.

(21) Appl. No.: 12/725,924

(22) Filed: Mar. 17, 2010

Related U.S. Application Data

(60) Provisional application No. 61/164,805, filed on Mar. 30, 2009, provisional application No. 61/166,391, filed on Apr. 3, 2009.

(51) Int. Cl.
*H04W 4/00* (2009.01)
*G08C 17/00* (2006.01)

(52) U.S. Cl.
USPC .......... 370/338; 370/311; 370/313; 370/328; 370/331

(58) Field of Classification Search
USPC .................. 370/311, 328, 329, 338, 339, 331
See application file for complete search history.

(56) References Cited

U.S. PATENT DOCUMENTS

| | | | | |
|---|---|---|---|---|
| 2003/0083095 | A1* | 5/2003 | Liang | 455/552 |
| 2003/0202531 | A1* | 10/2003 | Dooley et al. | 370/462 |
| 2004/0029619 | A1* | 2/2004 | Liang et al. | 455/562.1 |
| 2005/0059347 | A1* | 3/2005 | Haartsen | 455/41.2 |
| 2005/0170776 | A1* | 8/2005 | Siorpaes | 455/41.2 |
| 2005/0239474 | A9* | 10/2005 | Liang | 455/454 |
| 2006/0030265 | A1* | 2/2006 | Desai et al. | 455/41.2 |
| 2006/0030266 | A1* | 2/2006 | Desai et al. | 455/41.2 |
| 2006/0084383 | A1* | 4/2006 | Ibrahim et al. | 455/41.2 |
| 2006/0274704 | A1* | 12/2006 | Desai et al. | 370/338 |
| 2007/0066222 | A1* | 3/2007 | Tao et al. | 455/41.2 |
| 2007/0223430 | A1* | 9/2007 | Desai et al. | 370/338 |
| 2007/0274273 | A1* | 11/2007 | Grushkevich et al. | 370/338 |
| 2007/0279287 | A1* | 12/2007 | Castaneda et al. | 343/700 MS |
| 2008/0043705 | A1* | 2/2008 | Desai et al. | 370/346 |
| 2008/0080555 | A1* | 4/2008 | Carter et al. | 370/470 |
| 2008/0238807 | A1* | 10/2008 | Ibrahim et al. | 343/876 |
| 2008/0253345 | A1* | 10/2008 | Sanguinetti | 370/339 |
| 2008/0279162 | A1* | 11/2008 | Desai | 370/338 |
| 2009/0063740 | A1* | 3/2009 | Yeh et al. | 710/113 |
| 2009/0081962 | A1* | 3/2009 | Sohrabi | 455/79 |
| 2009/0103474 | A1* | 4/2009 | Lu et al. | 370/328 |
| 2009/0116437 | A1* | 5/2009 | Alexandre et al. | 370/329 |

(Continued)

*Primary Examiner* — Jenee Williams

(57) ABSTRACT

An apparatus has first and second wireless communication modules with respective first and second wireless communication signaling terminals. An arbiter is coupled to receive a request for access to an antenna from one of the first and second wireless communication modules. The arbiter is operable to cause the antenna to be coupled to one of the first and second wireless communication signaling terminals in response to the request, and a coexistence module is operable to prevent the arbiter from receiving a request from the second wireless communication module to thereby allow a communication of the first wireless communication module.

20 Claims, 10 Drawing Sheets

(56) References Cited

U.S. PATENT DOCUMENTS

| | | |
|---|---|---|
| 2009/0137206 A1* | 5/2009 | Sherman et al. ............. 455/41.2 |
| 2009/0196210 A1* | 8/2009 | Desai ............................ 370/311 |
| 2009/0238158 A1* | 9/2009 | Lewis ........................... 370/338 |
| 2009/0257379 A1* | 10/2009 | Robinson et al. ............. 370/329 |
| 2010/0008338 A1* | 1/2010 | Tsfati et al. ................... 370/338 |
| 2010/0040033 A1* | 2/2010 | Xhafa et al. .................. 370/338 |
| 2010/0061326 A1* | 3/2010 | Lee et al. ...................... 370/329 |
| 2010/0316027 A1* | 12/2010 | Rick et al. ..................... 370/336 |
| 2011/0007675 A1* | 1/2011 | Chiou et al. .................. 370/297 |
| 2011/0204990 A1* | 8/2011 | Stockstad ....................... 333/25 |
| 2011/0268051 A1* | 11/2011 | Tsao et al. .................... 370/329 |
| 2012/0020348 A1* | 1/2012 | Haverinen et al. ............ 370/339 |
| 2012/0034870 A9* | 2/2012 | Desai et al. ................... 455/41.2 |

* cited by examiner

ADDITION# APPARATUS AND METHOD FOR COEXISTENT WIRELESS AND BLUETOOTH COMMUNICATION EMPLOYING INTERRUPTION OF ARBITRATION REQUESTS TO ALLOCATE USE OF A SHARED ANTENNA

CROSS-REFERENCES TO RELATED APPLICATIONS

The present application claims the benefit of U.S. Provisional Application Ser. No. 61/164,805, entitled "Software Arbitration For WLAN and BT ACL Coexistence," filed on Mar. 30, 2009, and U.S. Provisional Application No. 61/166,391, entitled "Software Arbitration For WLAN and BT SCO Coexistence," filed on Apr. 3, 2009, both of which are hereby incorporated by reference herein in their entirety.

FIELD OF THE TECHNOLOGY

The present disclosure relates generally to wireless communication devices, and more particularly, to wireless communication devices employing a single antenna for communication via each of first and second wireless communication technologies.

DESCRIPTION OF THE RELATED ART

Wireless communication technologies and wireless communication devices have proliferated, which has led to the development of wireless communication devices in which disparate wireless communication technologies are combined. For example, a single mobile communication device may be able to communication via Wireless Local Area Network (WLAN) technology with a WLAN access point or via WiMAX or LTE technology with a WiMAX or LTE base station, or perform ad hoc network communication with another WLAN, WiMAX, LTE, or other communication device, while also communicating via Bluetooth technology with a wireless headset or other Bluetooth-enabled device.

Particularly in compact mobile devices where physical dimensions are often constrained, but also in other devices and for other reasons, such disparate wireless communication technologies may be employed using a shared antenna that is used for communication via both of the wireless communication technologies (e.g., WLAN and Bluetooth, WiMAX and Bluetooth, etc.) rather than using a separate, dedicated antenna for each wireless communication technology. However, achieving coexistence of disparate wireless communication technologies using a single antenna can be problematic.

For purposes of illustration, an example conventional wireless communication device 113 is depicted in FIG. 2, but the device also could be, for example, a mobile telephone, a cordless telephone, a gaming device, a music player, a laptop computer, a desktop computer, a digital picture frame, or a digital video recorder, to name a few. The wireless communication device 113 includes an antenna 115, a WLAN communication module 116, a Bluetooth communication module 118, an internal arbiter 120, and a three-position switch 122. The three-position switch 122 is operable to select one of first, second, and third terminals 123, 124, 125 for connection to the antenna 115, which is shared by the WLAN communication module 116 and the Bluetooth communication module 118 in the wireless communication device 113. The WLAN communication module 116 has a first wireless signaling terminal 128 through which the WLAN communication module 116 can provide WLAN transmission signals and which is connected to the first terminal 123 of the three-position switch 122. The WLAN communication module 116 also has another wireless signaling terminal 130 coupled to the second terminal 124 of the three-position switch 122 through which the WLAN communication module 116 can receive WLAN signals received by the wireless communication device 113 via the antenna 115. Similarly, the Bluetooth communication module 118 has a Bluetooth signaling terminal 132 through which the Bluetooth communication module 118 can provide Bluetooth transmission signals and which is coupled to the third terminal 125 of the three-position switch 122. The Bluetooth communication module 118 also may have an additional Bluetooth signaling terminal 134 coupled to the second terminal 124 of the three-position switch 122 through which the Bluetooth communication module 118 can receive Bluetooth signals received by the wireless communication device 113 via the antenna 115.

The internal arbiter 120 is coupled to receive requests from the WLAN communication module 116 and the Bluetooth communication module 118 via respective connections 126, 128 for use of the antenna 115. The internal arbiter 120 provides a control signal to the three-position switch 122 via a control input 129 to select which one of the inputs 123, 124, 125 is coupled to the antenna 115 at any given time.

FIG. 3 illustrates one conventional approach used by arbiter 120 to allocate access to the antenna 115 among the WLAN communication module 116 and the Bluetooth communication module 118. Whenever the internal arbiter 120 receives a request from either the WLAN communication module 116 or the Bluetooth communication module 118, as represented by a block 150 in FIG. 3, a determination is made (represented by a block 152), whether a grant of the antenna 115 is already in progress (i.e., whether the antenna has been allocated for communication by one of the wireless communication modules 116 or 118. If the block 152 determines that a grant is already in progress, then a block 154 determines whether this incoming request has a higher priority than the grant that is already in progress. Those skilled in the art will appreciate that each request made of the internal arbiter 120 has a priority associated therewith that is communicated to the internal arbiter 120 by whichever of the wireless communication modules made the request. If the block 154 determines that the incoming request has a higher priority, then the incoming request is granted by a block 156, meaning that the three-position switch 122 is moved to whichever position is required in order to fulfill the incoming request for the antenna 115. If the block 154 determines that the incoming request does not have a higher priority than the grant in progress, then the incoming request is denied by a block 158. Following the grant of the incoming request by the block 156 or the denial of the incoming request by the block 158, control returns to the block 150 to await receipt by the internal arbiter 120 of another request. In the event that the block 152 determines that no grant is in progress, then the block 154 is bypassed, and the incoming request is automatically granted by the block 156, inasmuch as there is no grant in progress at all, much less a grant having a priority higher than that of the incoming request.

The internal arbiter 120 may be arranged to give the highest priority to requests from the Bluetooth communication module 118, such that if the Bluetooth communication module 118 requires access to the antenna 115, the Bluetooth communication module 118 will be given access even if the WLAN communication module 116 also requires access to the antenna 115 at that time. Alternatively, for example, individual Bluetooth packets of different types may have different priorities with SCO and eSCO packets generally having the highest priority. Bluetooth ACL packets can be uniformly escalated to a high priority, or selected Bluetooth ACL packets may be assigned high priority.

SUMMARY

The present invention may be embodied in an apparatus comprising a first wireless communication module having at least a first wireless communication signaling terminal, a second wireless communication module having at least a second wireless communication signaling terminal, an arbiter (i) coupled to receive from one of the first and second wireless communication modules a request for access to an antenna and (ii) operable to cause the antenna to be coupled to one of the first and second wireless communication signaling terminals in response to the request, and a coexistence module operable to prevent the arbiter from receiving a request from the second wireless communication module to thereby allow a communication of the first wireless communication module.

More generally, a first wireless communication module may be provided with at least a first wireless communication signaling terminal, a second wireless communication module may be provided with at least a second wireless communication signaling terminal, and an arbiter may be coupled to receive from one of the first and second wireless communication modules a request for access to an antenna, wherein the arbiter is operable to cause the antenna to be coupled to one of the first and second wireless communication signaling terminals in response to the request. The arbiter may be prevented from receiving a request from the second wireless communication module to thereby allow a communication of the first wireless communication module.

DETAILED DESCRIPTION

Figure 1:
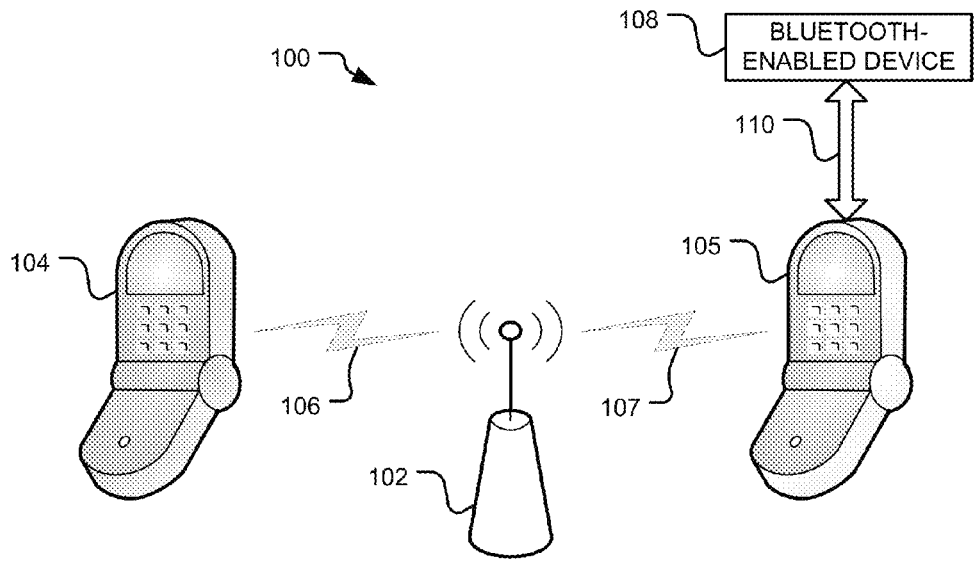
FIG. 1 is a diagram of an example communication system including a mobile communication device communicating with a headset or other Bluetooth-enabled device via a Bluetooth connection and communicating with a WLAN access point (AP) via a WLAN connection.

FIG. 1 depicts an example communication system 100 illustrative of the type of communication system in which WiFi and Bluetooth communications coexist and in which techniques for arbitration request interruption to facilitate WiFi communication can be used. The WiFi system 100 includes a WiFi access point 102 which may be coupled with a plurality of wireless stations 104, 105 for WiFi or other wireless communication between the access point and each of the wireless stations 104, 105. Each of the wireless stations 104, 105 and the access point 102 may communicate using one or more of the Institute of Electrical and Electronics Engineering (IEEE) 802.11 communication standards or any other desired technique for wireless communication, as indicated by the WiFi communication signals 106, 107.

As shown in FIG. 1, the wireless station 105 is Bluetooth-enabled. In other words, in addition to receiving WiFi data packets from the access point 102 of the wireless local area network 100, the wireless station 105 also is capable of connecting to and communicating bidirectionally with a headset or any other suitable Bluetooth-enabled device 108 via a Bluetooth connection 110.

Figure 2:
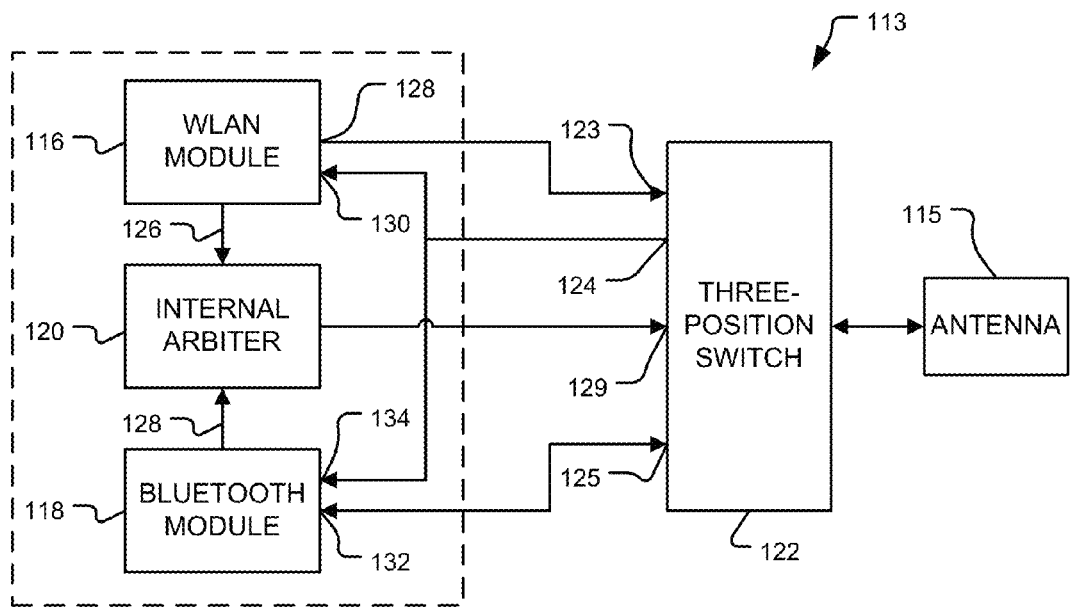
FIG. 2 is a high-level block diagram of an example architecture for the mobile communication device employing coexistent WLAN and Bluetooth communications in the communication system of FIG. 1.
Figure 3:
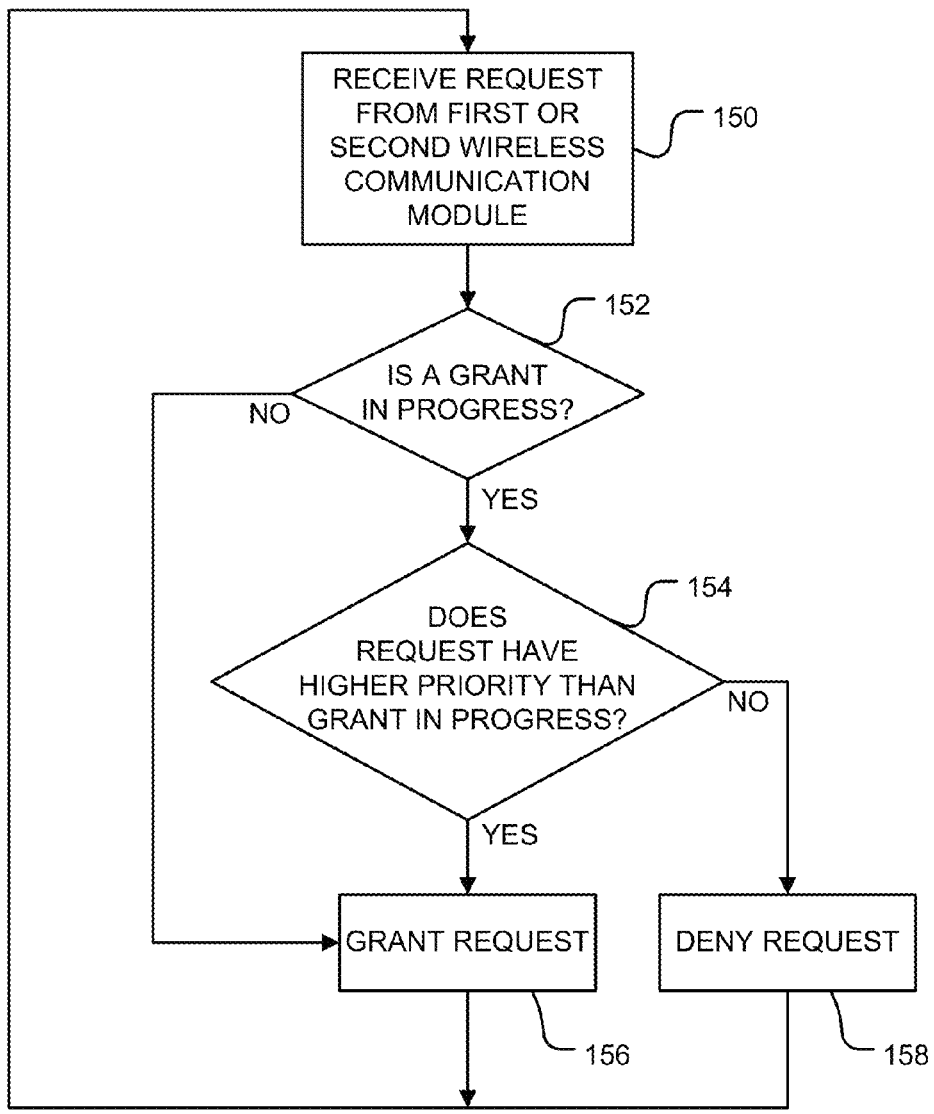
FIG. 3 is a flowchart illustrating an example operation of the internal arbiter of the mobile communication device shown in FIG. 2.

Devices that employ strict priority-based arbitration to allocate antenna access, such as the wireless communication device 113 described above and shown in FIG. 2 present a problem in that requests of the WLAN communication module 116 may be ignored while the Bluetooth communication module 118 is transmitting and/or receiving data via the antenna 115, or, if the WLAN communication module 116 is transmitting and/or receiving data when the Bluetooth communication module 118 requests access to the antenna 115, then the data being transmitted or received by the WLAN communication module 116 may be lost. This, in turn, may create a further problem for the WLAN communication module 116. Some WLAN access points 102 (FIG. 1) are configured such that if a WLAN communication module 116 fails to timely acknowledge receipt of a data packet transmitted to the WLAN communication module 116 by the access point 102, then the data rate that the access point 102 uses for subsequent communication with the WLAN communication module 116 may be reduced, or the access point 102 may disconnect the WLAN communication module 116 altogether, which is undesirable.

Figure 4:
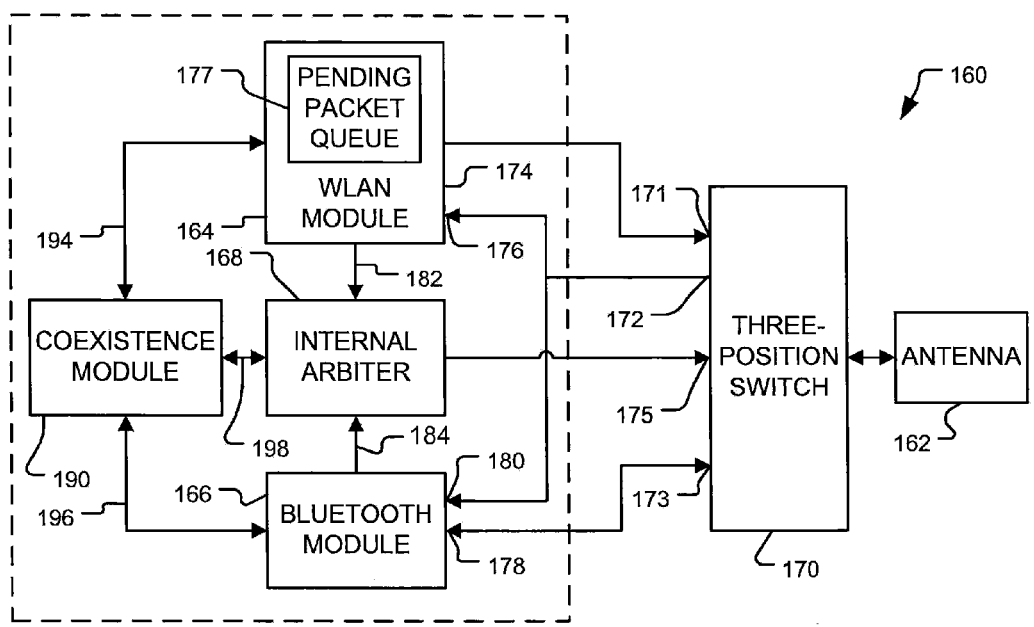
FIG. 4 is a high-level block diagram of an example architecture for a mobile communication device in which arbitration request interruption techniques can be used.

FIG. 4 illustrates an example architecture for a mobile communication device 160 (e.g., the wireless station 105 shown in FIG. 1) employing a single antenna 162 for communication via each of first and second wireless communication protocols. In order to at least reduce the chance that WLAN data packets will be lost or that the data rate used for WLAN communication will be reduced as described above, the mobile communication device 160 employs arbitration request interruption techniques such as described herein.

The illustrated communication device 160 employs coexistent WLAN and Bluetooth communication, but it should be understood that other wireless communication protocols, such as WiMAX for example, could be used instead according to the principles of the present invention, which are not limited to coexistent WLAN and Bluetooth communication. As shown, the mobile communication device 160 includes an antenna 162, a WLAN communication module 164, a Bluetooth communication module 166, an internal arbiter 168, and a three-position switch 170. The three-position switch 170 is operable to select one of first, second, and third terminals 171, 172, 173 for connection to the antenna 162, which is shared by the WLAN communication module 164 and the Bluetooth communication module 166 in the mobile communication device 160. The WLAN communication module 164 and the Bluetooth communication module 166 can be fabricated in a single integrated circuit or can be distributed among a plurality of separate hardware components and/or implemented in one or more software modules and/or firmware in any given embodiment.

The WLAN communication module 164 has a first wireless signaling terminal 174 through which the WLAN communication module 164 can provides WLAN transmission signals and which is connected to the first terminal 171 of the three-position switch 170. The WLAN communication module 164 also may have another wireless signaling terminal 176 coupled to the second terminal 172 of the three-position switch 170 through which the WLAN communication module 164 can receive WLAN signals received by the mobile communication device 160 via the antenna 162. Similarly, the Bluetooth communication module 166 has a Bluetooth signaling terminal 178 through which the Bluetooth communication module 166 provides Bluetooth transmission signals and which is coupled to the third terminal 173 of the three-position switch 170. The Bluetooth communication module 166 also may have an additional Bluetooth signaling terminal 180 coupled to the second terminal 172 of the three-position switch 170 through which the Bluetooth communication module 166 can receive Bluetooth signals received by the mobile communication device 160 via the antenna 162. The internal arbiter 168 is coupled to receive from the WLAN communication module 164 and the Bluetooth communication module 166 via respective connections 182, 184 requests for use of the antenna 162. The internal arbiter 168 provides a control signal to the three-position switch 170 via a control input 175 to select which one of the inputs 171, 172, 173 is coupled to the antenna 162 at any given time. The mobile communication device 160 also includes a coexistence module 190 which communicates with the WLAN communication module 164 via a connection 194, with the Bluetooth communication module 166 via connection 196, and with the internal arbiter 168 via a connection 198.

Figure 5:
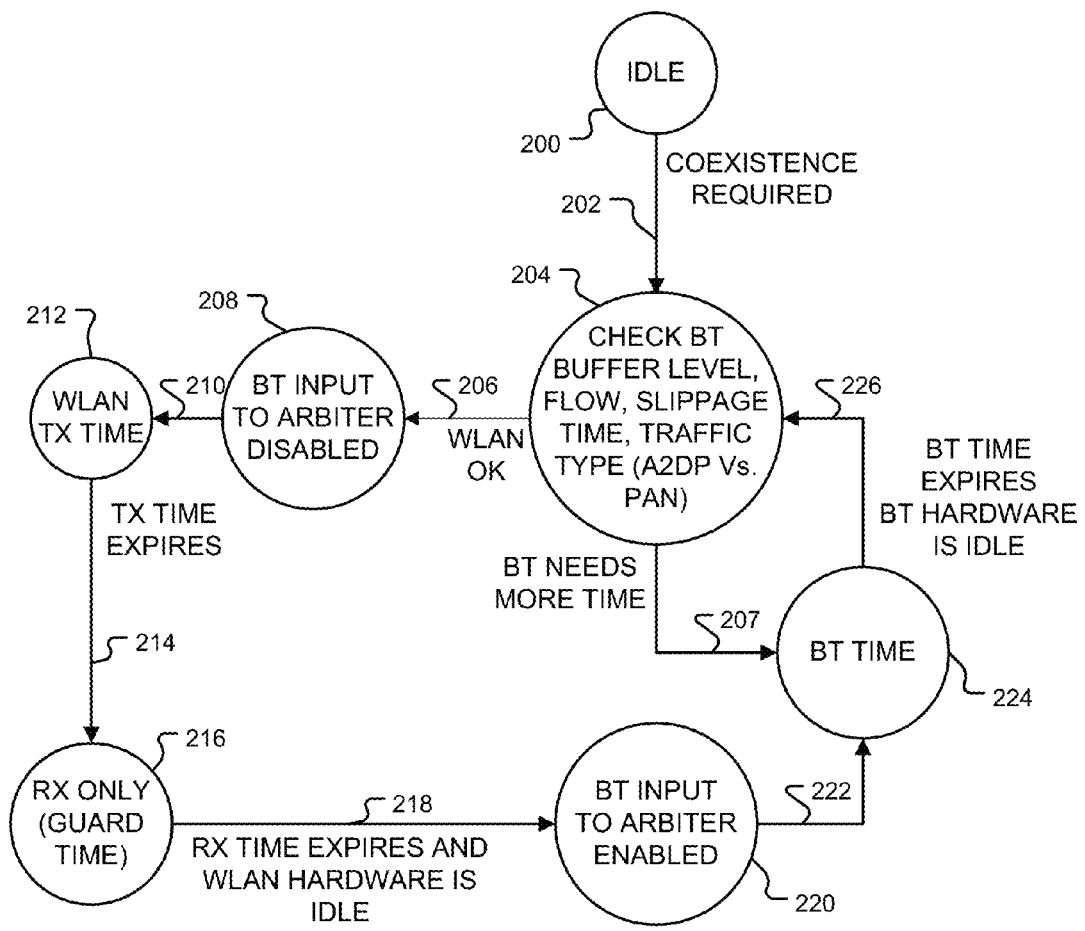
FIG. 5 is an example state diagram representing one example approach by which the coexistence module shown in FIG. 4 provides for coexistence between WLAN communication and asynchronous Bluetooth communication.

In an embodiment, the coexistence module 190 operates in accordance with a state diagram such as that shown in FIG. 5, which illustrates one example approach by which the coexistence module 190 can provide for coexistence between WLAN communication and asynchronous Bluetooth communication (e.g., Bluetooth ACL or asynchronous connectionless link communication).

As illustrated in FIG. 5, beginning from an idle state 200, the coexistence module 190 makes a transition 202 from the idle state 200 to a state 204 whenever coexistence is required (i.e., whenever the WLAN communication module 164 requests access to the antenna 162 when the Bluetooth communication module 166 also requires access to the antenna 162). In the state 204, the coexistence module 190 determines whether certain conditions relating to Bluetooth communication are met. In one example, the state 204 checks whether a Bluetooth data buffer is full such that Bluetooth data must be transmitted, or whether the Bluetooth data buffer is not full and WLAN data can be transmitted, and whether the Bluetooth communication module 166 is currently transmitting and should be allowed to finish within a slippage time assigned for Bluetooth communication. The type of Bluetooth data being transmitted, such as advanced audio distribution profile (A2DP) or personal area networking (PAN), for example, can also weigh into whether ongoing Bluetooth communication is interrupted by a pending WLAN communication. If the conditions tested in the state 204 are satisfied, the coexistence module 190 makes a transition 206 to a state 208. However, if the conditions tested in the state 204 are not satisfied (in other words, if more time is required to complete the ongoing Bluetooth communication), then the coexistence module 190 makes a transition 207 to a state 224 discussed below.

In the state 208, the coexistence module 190 disables the Bluetooth input 184 to the internal arbiter 168. As a consequence, the internal arbiter 168 is not able to receive requests made by the Bluetooth communication module 166 for access to the antenna 162, and those requests therefore cannot take priority over requests by the WLAN communication module 164 for access to the antenna 162. The coexistence module 190 then makes a transition 210 to a state 212 in which a timer runs to implement a limit on the amount of time allowed for WLAN transmission. When the WLAN transmission time expires, or if there is no more WLAN data to be transmitted, the coexistence module 190 makes a transition 214 to a state 216 in which a further timer implements a Guard Time limit on the amount of time allowed for the WLAN communication module 164 to receive data. The WLAN transmission Guard Time limit normally will be slightly less than the time between successive Bluetooth slots and may be determined by subtracting the above-mentioned slippage time (e.g., 0.5-1-0 ms) and the WLAN receive (RX) guard time (e.g., 1-2 ms) from the amount of WLAN transmission time available (e.g., 14 ms). The WLAN RX guard time may be determined dynamically based on, for example, the average and standard deviation of round-trip communication times for signaling between the wireless communication device 160 and the WLAN access point 102. When the WLAN receive or Guard Time expires and the WLAN communication module 164 is idle, the coexistence module 190 makes a transition 218 to a state 220 in which the Bluetooth input 184 to the internal arbiter 168 is enabled so that requests by the Bluetooth communication module 166 for the antenna 162 can once again be conveyed to the internal arbiter 168 and thus Bluetooth communication can resume. The coexistence module 190 then makes a transition 222 to a state 224 which implements a time allotment for Bluetooth communication. When this time allotment expires, the coexistence module 190 makes a transition 226 back to the state 206 discussed above.

From any of the states 204, 208, 212, 216, 220, or 224, if coexistence ceases to be required, such as if a connection between the mobile communication device 160 and a WLAN access point is lost, then the coexistence module makes a transition (not illustrated in FIG. 5) back to the idle state 200, in which event all inputs to the internal arbiter 168 are restored.

Figure 6:
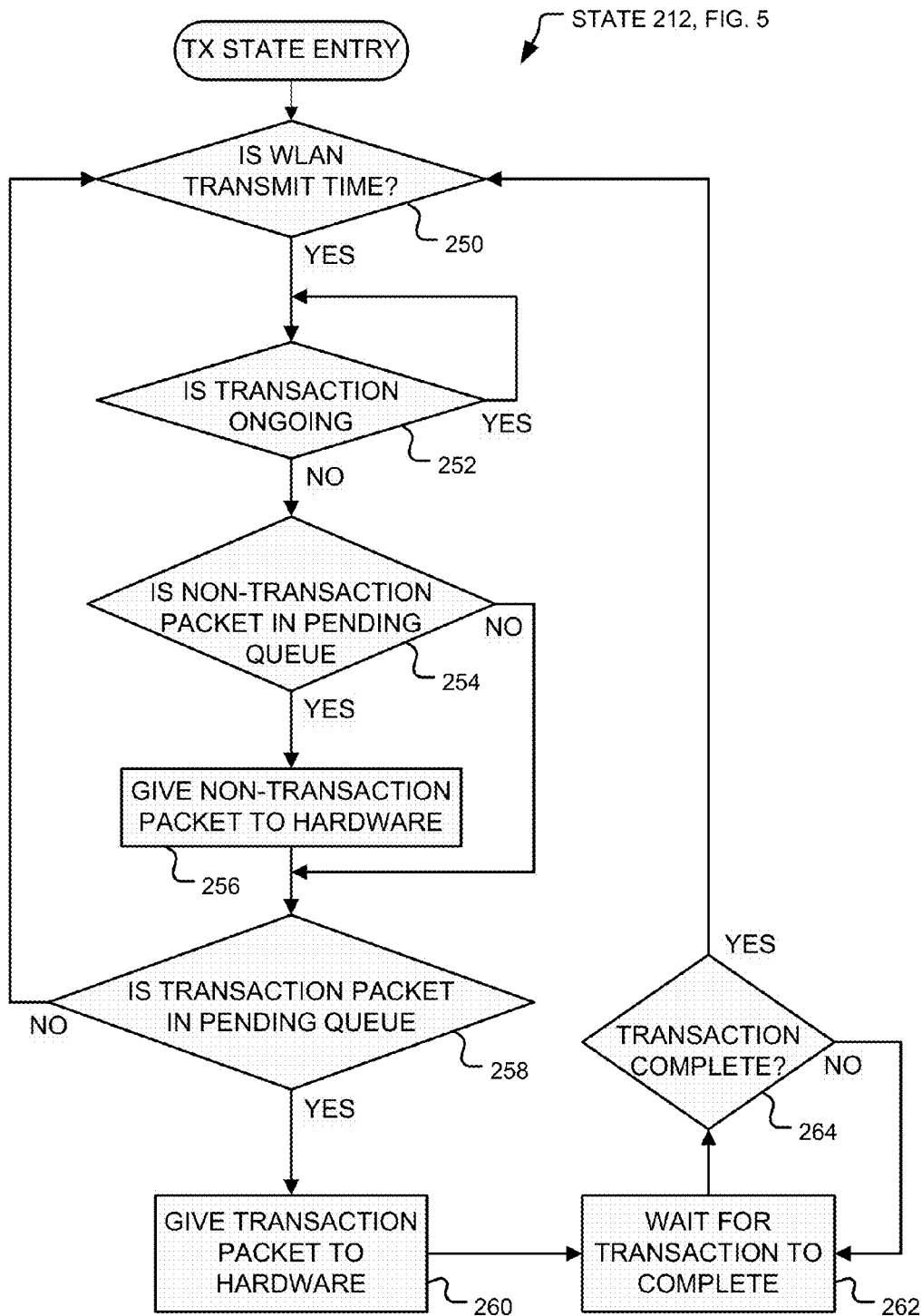
FIG. 6 is a flowchart illustrating an example approach for operation of the mobile communication device shown in FIG. 4 for coexistent WLAN and asynchronous Bluetooth communication.

FIG. 6 depicts a flowchart illustrating one example approach for operation of the mobile communication device 160 for coexistent WLAN and asynchronous Bluetooth communication and, in particular, this flowchart illustrates one implementation of the state 212 of the state diagram shown in FIG. 5. Those skilled in the art will readily appreciate that the routine illustrated in FIG. 6 need only operate when at least one WLAN data packet has been placed in a pending packet queue 177 stored within the WLAN communication module 164 to await transmission by the WLAN communication module 164 (FIG. 4). WLAN data packets may be placed in the pending packet queue 177 when the coexistence module 190 directs such placement. As shown in FIG. 6, a block 250 first determines whether WLAN transmit time is active. If the block 250 determines that the WLAN transmit time is active (which it will when the coexistence module 190 initially enters the state 212 and may again in subsequent passes through the routine shown in FIG. 6), then a block 252 determines whether a transaction is ongoing. If so, then the block 252 may make this determination again repeatedly until the transaction is completed, or the block 252 may await a notification that the transaction is complete. When the block 252 determines or is notified that no transaction is ongoing, a block 254 determines whether a non-transaction packet is present in the pending packet queue 177. If so, then at a block 256 the non-transaction packet is given to hardware for transmission. Thereafter, or if the block 254 determines that no non-transaction packet is present in the pending packet queue 177, a block 258 determines whether a transaction packet (i.e., a packet in response to which a packet in addition to a layer-2 ACK is expected) is present in the pending packet queue 177. If no transaction packet is present in the pending packet queue 177, then control returns to the block 250 discussed above. If the block 258 determines that a transaction packet is present in the pending packet queue 177, then at a block 260, the transaction packet is given to hardware, and a block 262 awaits completion of the transaction. A block 264 then determines whether the transaction is complete. If not, control returns to the block 262 to await completion of the transaction. If the block 264 determines that the transaction is complete, then control returns to the block 250 discussed above. When the block 250 determines that WLAN transmit time has elapsed, execution of the routine illustrated by the flowchart of FIG. 6 ends, and the coexistence module 190 then makes the transition 214 to the state 216 as discussed above in connection with FIG. 5.

Figure 7:
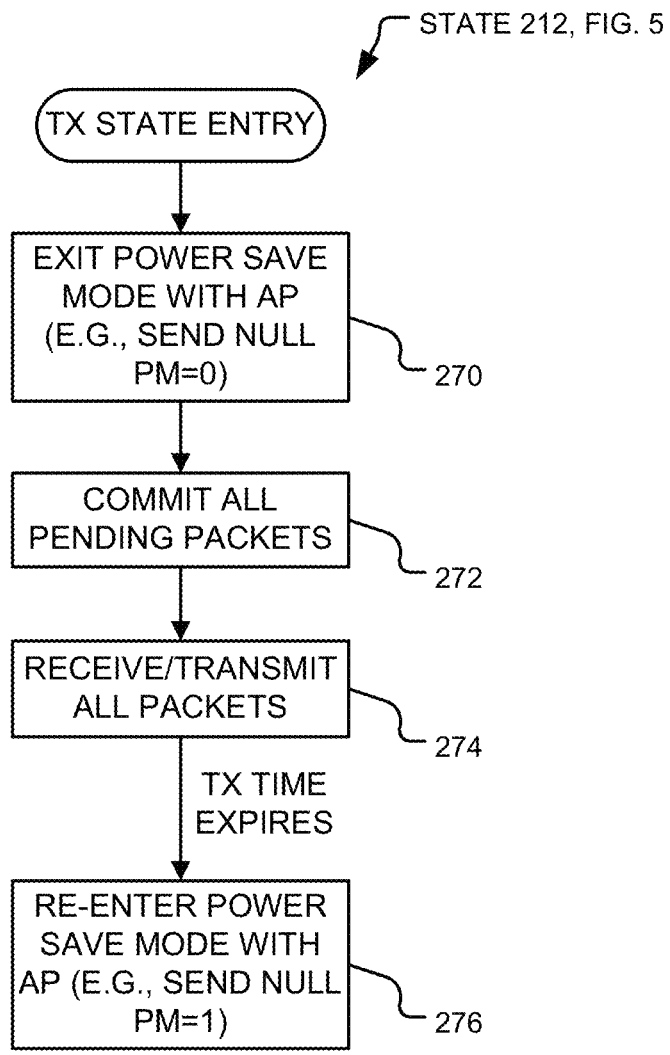
FIG. 7 is a flowchart illustrating an example approach for operation of the mobile communication device shown in FIG. 4 for high-duration WLAN transmissions.

The routine illustrated in FIG. 6 is generally applicable to WLAN transmissions of relatively short duration (e.g., approximately 8-15 ms in one embodiment). FIG. 7 illustrates an example approach for operation of the mobile communication device 160 for longer WLAN transmissions (e.g., approximately 25 ms or more in one embodiment). Similar to the implementation of FIG. 6, the implementation of FIG. 7 also corresponds to the state 212 of the state diagram of FIG. 5 and operates if at least one WLAN data packet has been placed in the pending packet queue 177 for transmission by the WLAN communication module 164. Initially, a block 270 causes a null packet with a power management (PM) bit set to zero to cause the mobile communication device 160 to exit power save mode with the WLAN access point 102 (shown in FIG. 1). A block 272 then commits all pending packets to pending packet queues, and a block 274 receives or transmits all pending packets. When the WLAN transmit time expires, or within a suitable guard time in advance of that expiration, a block 276 causes a null packet with the power management (PM) bit set to one to cause the mobile communication device 160 to re-enter power save mode with the WLAN access point 102.

Figure 8:
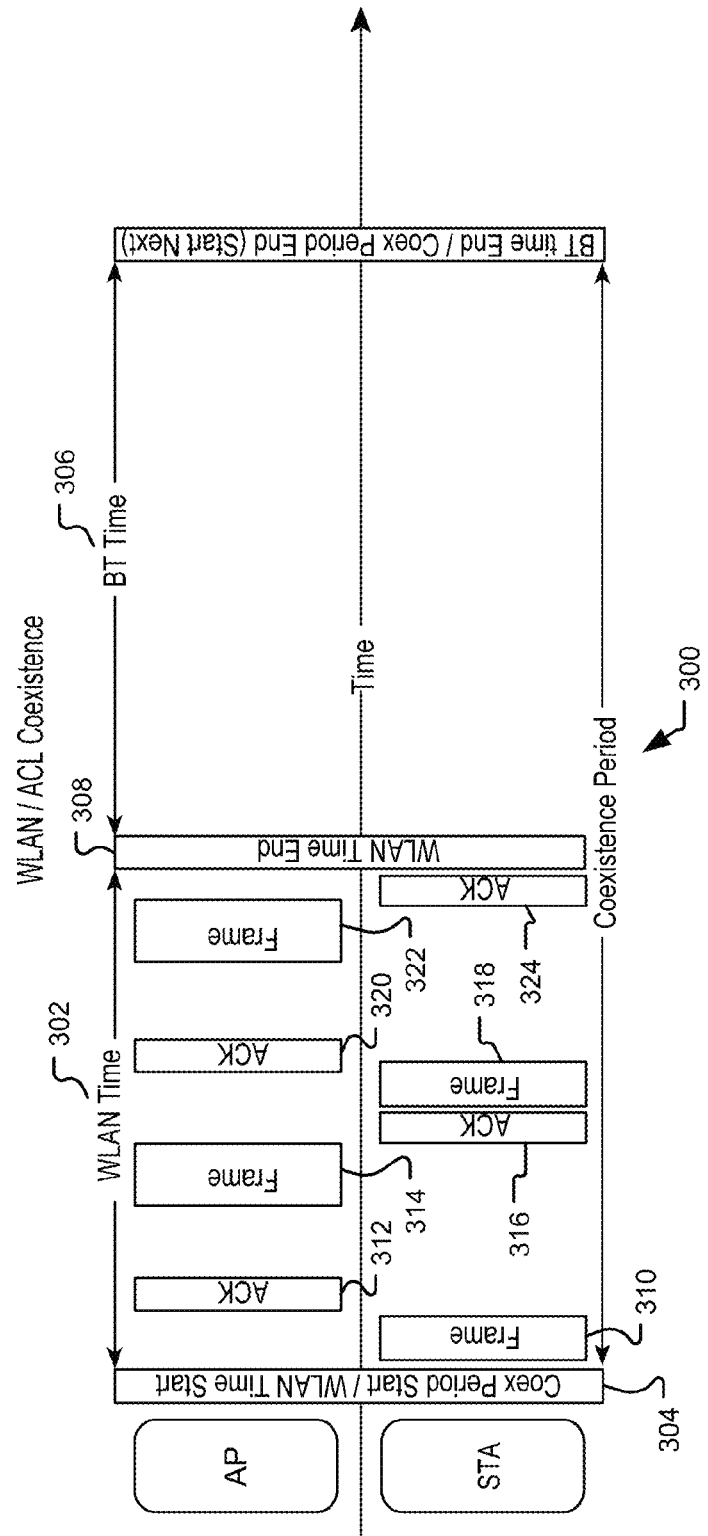
FIG. 8 is a data flow diagram illustrating coexistent WLAN and asynchronous Bluetooth communication.

FIG. 8 depicts a data flow diagram illustrating coexistent WLAN and asynchronous Bluetooth communication that the mobile communication device 160 of FIG. 4 can provide when operating as described above in connection with FIGS. 5-7. This diagram illustrates chronological flow of data packets transmitted by the mobile communication device 160 to the WLAN access point 102 and transmitted by the access point 102 to the mobile communication device 160. As shown, a WLAN/Bluetooth ACL coexistence period is subdivided into a WLAN time 302, the beginning of which coincides with the coexistence period start 304, and a Bluetooth time 306, which starts at the WLAN time end 308. During the WLAN time 302, the mobile communication device 160 (denoted "STA" in FIG. 8) transmits a data frame to the access point 102 (AP), the AP sends back an acknowledgement packet (denoted "ACK") 312 followed by a data frame 314, and the mobile communication device 160 returns an acknowledgement packet (ACK) 316. Time permitting, this transaction may be followed by a second series of frame 318, ACK 320, frame 322, ACK 324, as shown. At the conclusion of the WLAN time, time is allocated for Bluetooth ACL communication, which time ends at the conclusion of the coexistence period 300, and which may then be followed by another coexistence period for as long as WLAN/Bluetooth ACL coexistence is required (i.e., as long as WLAN and Bluetooth are both active).

Figure 9:
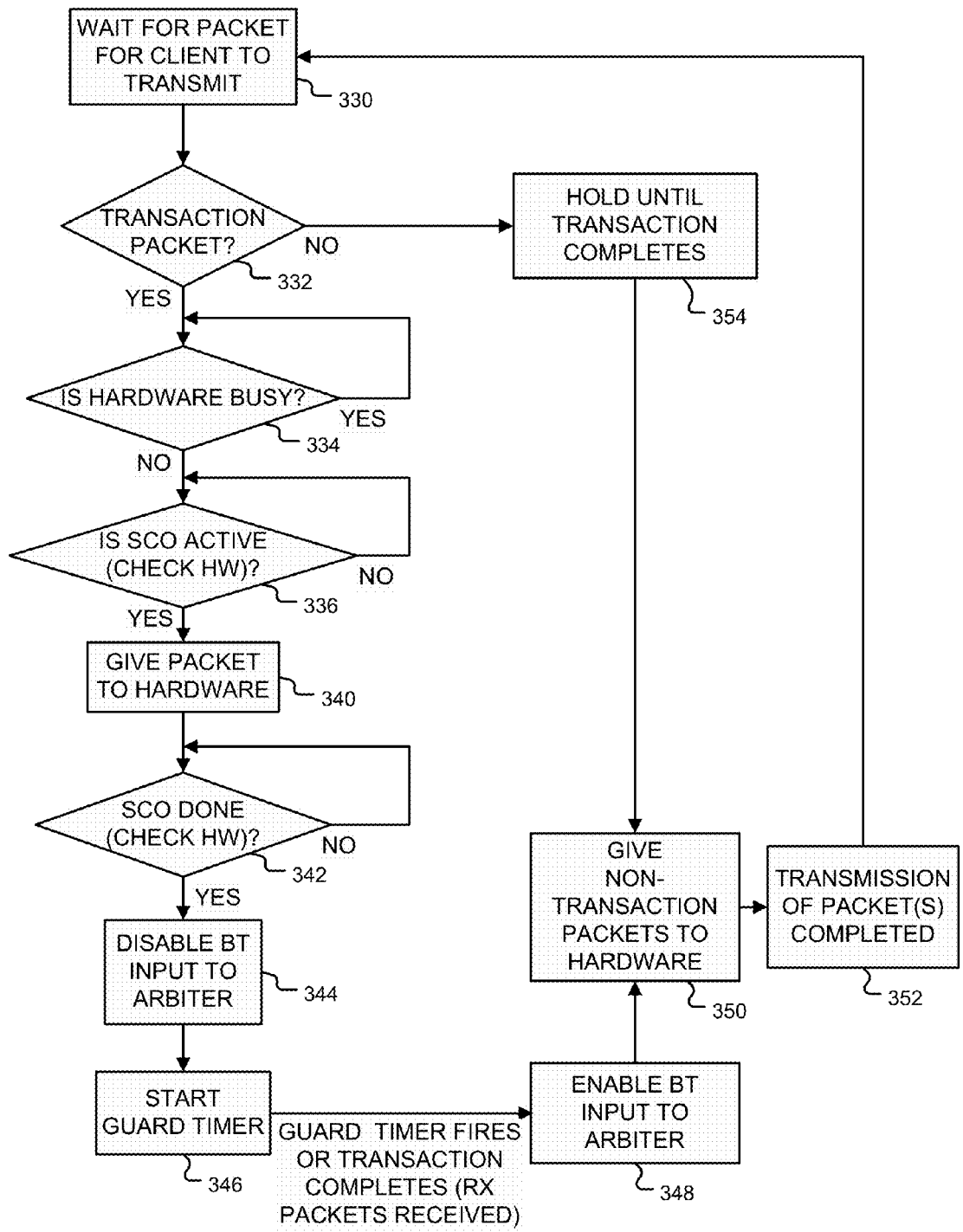
FIG. 9 is a is a flowchart illustrating an example approach for operation of the mobile communication device shown in FIG. 4 for coexistent WLAN and synchronous Bluetooth communication.

FIG. 9 depicts a flowchart illustrating an example approach for operation of the mobile communication device 160 for coexistent WLAN and synchronous Bluetooth communication, such as Bluetooth SCO transmissions. Initially, a block 330 waits for a packet for the WLAN communication module 164 to transmit. When a packet is queued for transmission by the WLAN communication module 164, a block 332 determines whether the packet is a transaction packet. If the block 332 determines that the packet is a transaction packet, then a block 334 determines whether the WLAN hardware is busy, for example transmitting another packet or receiving a packet. If so, control returns to the block 334 to implement a delay until the WLAN hardware is not busy. When the block 334 determines that the WLAN hardware is not busy, a block 336 determines whether Bluetooth SCO communication is active, such as by checking the Bluetooth hardware. If the block 336 determines that the Bluetooth SCO communication is not active, then control returns to the block 336 to implement a delay until the Bluetooth SCO communication is active. When the block 336 determines that the Bluetooth SCO communication is active, a block 340 provides the packet to the WLAN communication module 164. A block 342 then determines whether the Bluetooth SCO transmission is finished, again, for example, by checking the Bluetooth hardware. If not, then control returns to the block 342 to delay until the SCO transmission is finished, at which point a block 344 disables the Bluetooth input 184 to the internal arbiter 168 (FIG. 4). A block 346 then starts a guard timer to allow for a suitable guard time (e.g., 2.4 ms which is slightly less than the time between successive Bluetooth slots). When the guard timer expires or the transaction completes (i.e., incoming packets are received), a block 348 re-enables the Bluetooth input 184 to the internal arbiter 168. A block 350 then gives the non-transaction packets to hardware for transmission, a block 352 completes the transmission of those packets, and control returns to the block 330 to wait for another packet for transmission. In the event that the block 332 described above determines that the packet queued for transmission is not a transaction packet, a block 354 holds the packet until the pending transaction completes, and then control passes to the block 350.

Figure 10:
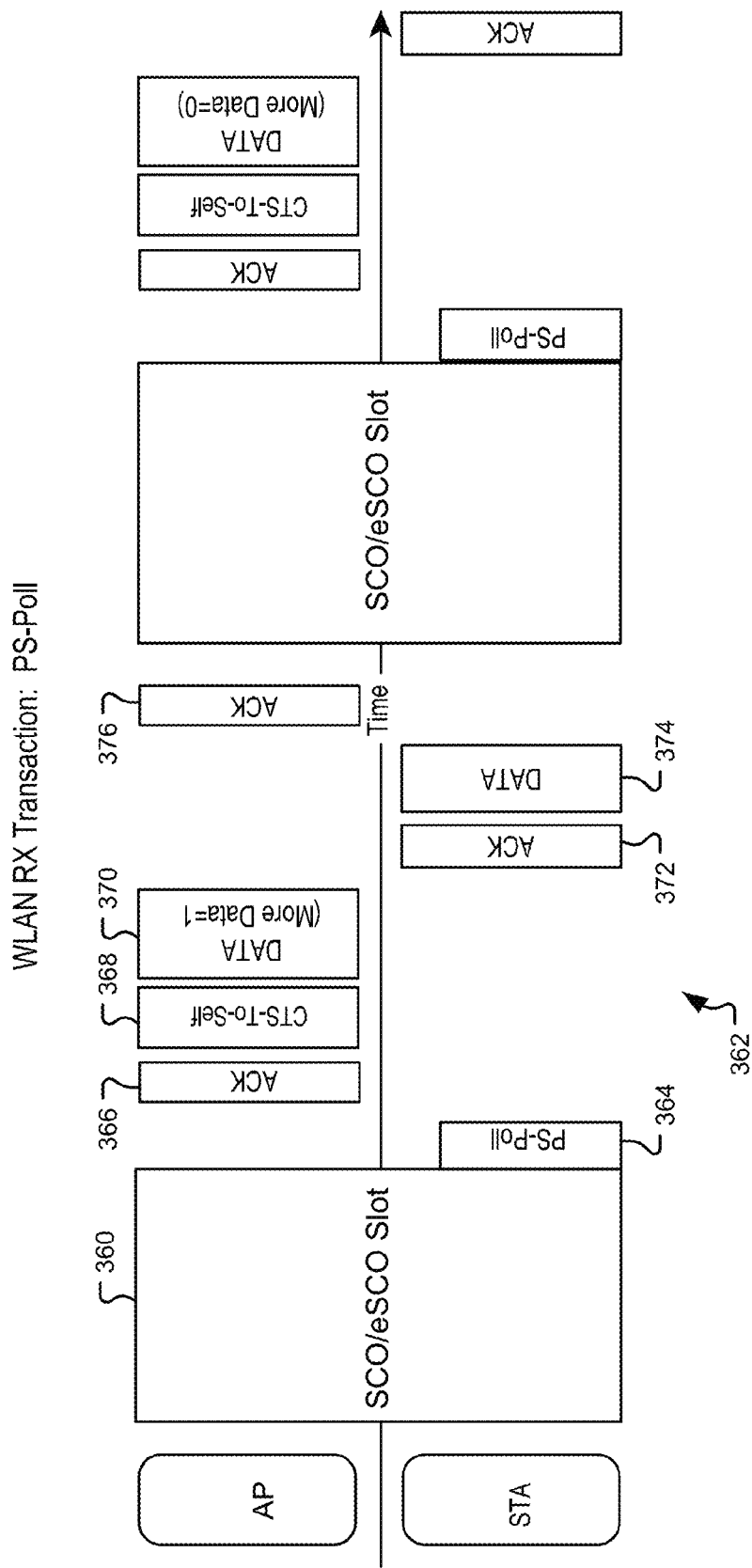
FIG. 10 is a data flow diagram illustrating coexistent WLAN and synchronous Bluetooth communication.
Figure 11:
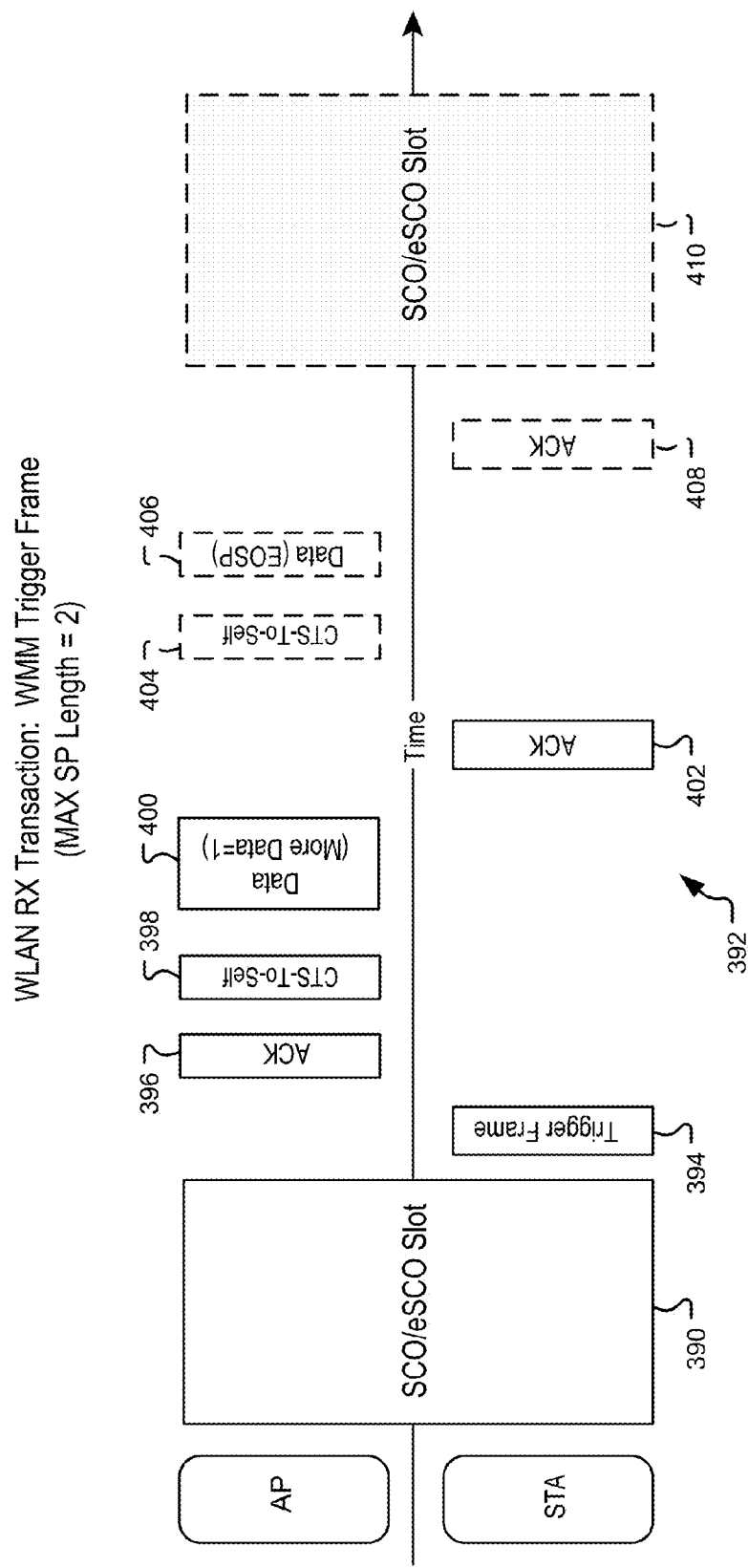
FIG. 11 is a data flow diagram illustrating another example approach to coexistent WLAN and synchronous Bluetooth communication.

FIGS. 10 and 11 depict data flow diagrams illustrating two examples of coexistent WLAN and synchronous Bluetooth communication that the mobile communication device 160 of FIG. 4 can provide when operating as described above in connection with FIG. 8. One example involves WLAN communication using a power save (PS) poll (FIG. 10), and the other involves WLAN communication using one or more WMM trigger frames (FIG. 11). The data flow diagram of FIG. 10 illustrates chronological flow of data packets transmitted by the mobile communication device 160 to the WLAN access point 102 and transmitted by the access point 102 to the mobile communication device 160. As shown, each coexistence cycle (two of which are shown in FIG. 10) includes a SCO (or eSCO) slot 360 during which Bluetooth SCO or eSCO data is transmitted, followed by a WLAN slot 362. During the first (i.e., left-most) coexistence cycle shown in FIG. 10, the mobile communication device 160 (STA) transmits a PS poll 364 to the access point 102. The access point 102 then returns an acknowledgement (ACK) 366, followed optionally by a CTS-to-self frame 368 and then followed by a DATA frame 370. The mobile communication device 160 then transmits an acknowledgement (ACK) 372 and a DATA frame 374, which the access point 102 acknowledges with an acknowledgement (ACK) 376. As shown in FIG. 10, the DATA frame 370 sent by the access point 102 may contain a More Data bit set equal to one to signify that the access point 102 has more data to transmit to the mobile communication device 160. In that event, in a subsequent coexistence cycle, the additional data may be transmitted via another PS poll frame as shown. When the access point 102 has no more data to transmit, the access point 102 may signify this fact by including a More Data bit set equal to zero in the final DATA frame as shown in the right-most coexistence cycle of FIG. 10.

FIG. 11 depicts a data flow diagram similar to that shown in FIG. 10, except that the WLAN communication is performed using WMM trigger frames instead of PS polls. As shown, each coexistence cycle (one of which is shown in FIG. 11) includes a SCO (or eSCO) slot 390 during which Bluetooth SCO or eSCO data is transmitted, followed by a WLAN slot 392. During the illustrated WLAN slot, the mobile communication device 160 (STA) transmits a WMM trigger frame 394 to the access point 102. The access point 102 then returns an acknowledgement (ACK) 396, followed optionally by a CTS-to-self frame 398 and then followed by a DATA frame 400. The mobile communication device 160 then transmits an acknowledgement (ACK) 402. As shown in FIG. 11, the DATA frame 400 sent by the access point 102 may contain a More Data bit set equal to one to signify that the access point 102 has more data to transmit to the mobile communication device 160. In that event, the access point 102 may send additional data via successive frames, such as the illustrated CTS-to-self frame 404 and DATA frame 406. When the access point 102 has no more data to transmit, the access point 102 may signify this fact by including an EOSP flag in the final DATA frame as shown in FIG. 11 and, if there is not more data to transmit, also including a More Data bit set equal to zero. Of course, additional coexistence periods may follow the one illustrated, as indicated by the illustrated succeeding SCO/eSCO slot 400 shown in phantom lines in FIG. 11 for as long as WLAN/Bluetooth SCO or eSCO coexistence is required (i.e., as long as WLAN and Bluetooth are both active).

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions, or deletions in addition to those explicitly described above may be made to the disclosed embodiments without departing from the scope of the invention.

What is claimed is:

1. An apparatus comprising:
    a first wireless communication module having a first antenna request terminal and at least a first wireless communication signaling terminal;
    a second wireless communication module having a second antenna request terminal and at least a second wireless communication signaling terminal;
    an arbiter (i) coupled to receive from one of the first wireless communication module or the second wireless communication module, via the first antenna request terminal or the second antenna request terminal, respectively, a request for access to an antenna and (ii) operable to cause the antenna to be coupled to one of the first wireless communication signaling terminal or the second wireless communication signaling terminal in response to the request; and
    a coexistence module operable to prevent the arbiter from receiving a request from the second wireless communication module to thereby allow a communication of the first wireless communication module by disabling the second antenna request terminal.

2. The apparatus of claim 1, further comprising the antenna.

3. The apparatus of claim 1, wherein the coexistence module further comprises a switch (i) responsive to a signal from the first wireless communication module and (ii) operable to prevent the arbiter from receiving a request from the second wireless communication module.

4. The apparatus of claim 3, wherein the switch comprises a binary flag, and wherein the arbiter does not receive a request from the second wireless communication module while the binary flag has a particular value.

5. The apparatus of claim 1, wherein the first wireless communication module operates according to a different communication protocol relative to the second wireless communication module.

6. The apparatus of claim 1, wherein the first wireless communication module operates according to one of a wireless local area network (WLAN) protocol or a WiMAX protocol.

7. The apparatus of claim 1, wherein the second wireless communication module operates according to a Bluetooth protocol.

8. The apparatus of claim 1, wherein the first wireless communication module and the second wireless communication module are disposed on a single integrated circuit.

9. The apparatus of claim 1, wherein the first wireless communication module and the second wireless communication module are disposed on separate integrated circuits.

10. The apparatus of claim 1, wherein the first wireless communication module has a wireless transmit terminal and a wireless receive terminal, and wherein the arbiter is operable to couple the antenna to one of the wireless transmit terminal, the wireless receive terminal, or the second wireless communication signaling terminal of the second wireless communication module.

11. The apparatus of claim 1, wherein the apparatus comprises one of a mobile telephone, a cordless telephone, a gaming device, a music player, a laptop computer, a desktop computer, a digital picture frame, or a digital video recorder.

12. The apparatus of claim 1, wherein the coexistence module is configured to prevent the arbiter from receiving the request from the second wireless communication module while a transmission timer for the first wireless communication module has not expired.

13. A method comprising:
providing a first wireless communication module having a first antenna request terminal and at least a first wireless communication signaling terminal;
providing a second wireless communication module having a second antenna request terminal and at least a second wireless communication signaling terminal;
providing an arbiter coupled to receive from one of the first wireless communication module or the second wireless communication module, via the first antenna request terminal or the second antenna request terminal, respectively, a request for access to an antenna, wherein the arbiter is operable to cause the antenna to be coupled to one of the first wireless communication signaling terminal or the second wireless communication signaling terminal in response to the request; and
preventing the arbiter from receiving a request from the second wireless communication module to thereby allow a communication of the first wireless communication module by disabling the second antenna request terminal.

14. The method of claim 13, further comprising providing an antenna for communications of the first wireless communication module and the second wireless communication module.

15. The method of claim 13, further comprising providing a switch responsive to a signal from the first wireless communication module and operable to prevent the arbiter from receiving a request from the second wireless communication module.

16. The method of claim 15, wherein the switch comprises a binary flag, and wherein the arbiter does not receive a request from the second wireless communication module while the binary flag has a particular value.

17. The method of claim 13, further comprising operating the first wireless communication module and the second wireless communication module according to different communication protocols.

18. The method of claim 13, further comprising operating the first wireless communication module according to one of a wireless local area network (WLAN) protocol or a WiMAX protocol.

19. The method of claim 13, further comprising operating the second wireless communication module according to a Bluetooth protocol.

20. The method of claim 13, further comprising providing the first wireless communication module with a wireless transmit terminal and a wireless receive terminal, and operating the arbiter to couple the antenna to one of the wireless transmit terminal, the wireless receive terminal, or the second wireless communication signaling terminal of the second wireless communication module.

* * * * *